Figure 1:
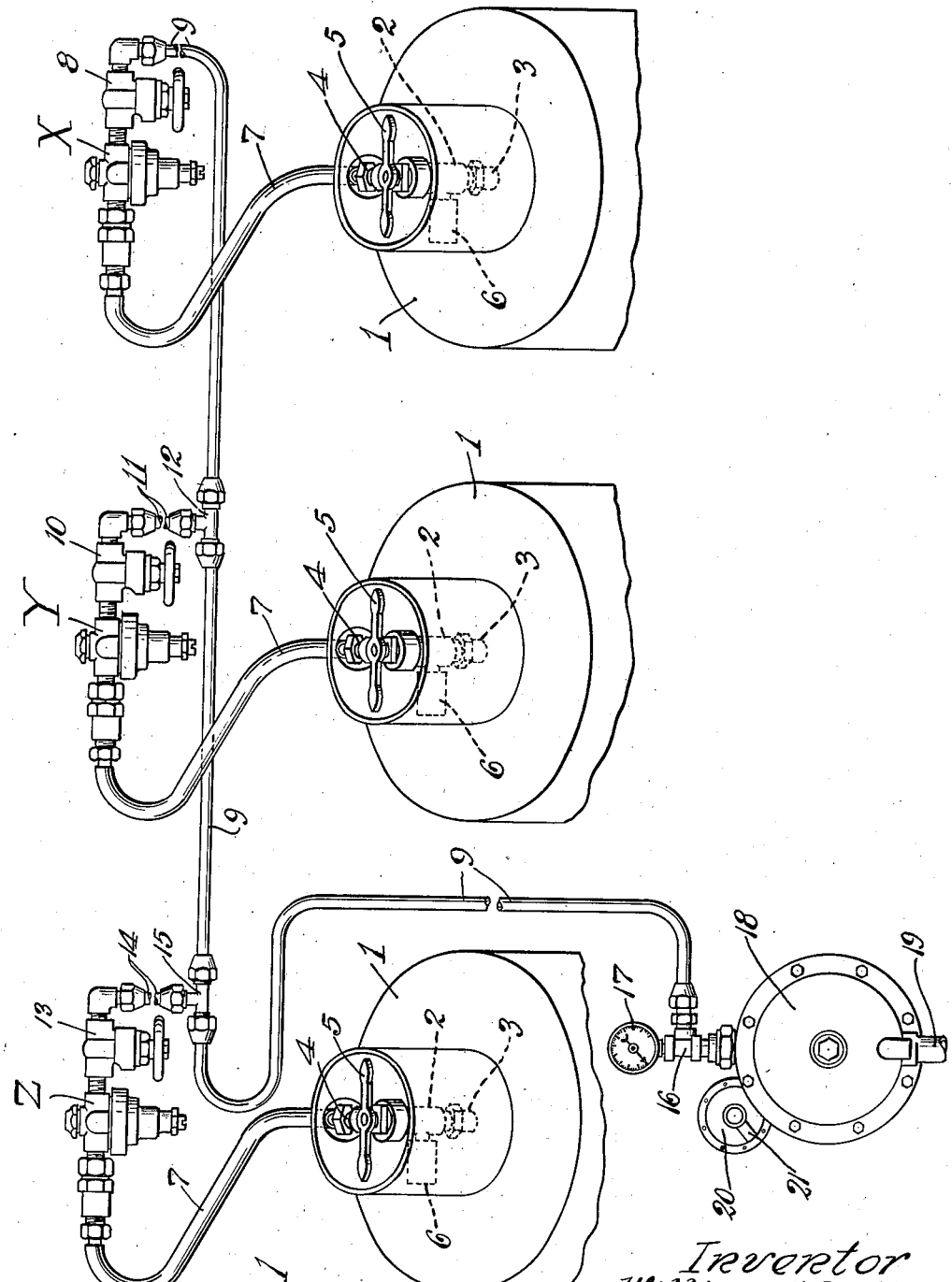

Oct. 17, 1939.   W. C. BUTTNER   2,176,580
GAS SUPPLY SYSTEM
Filed March 11, 1938

Inventor
William C. Buttner
by Parker & Carter
Attorneys.

Patented Oct. 17, 1939

2,176,580

UNITED STATES PATENT OFFICE 2,176,580

GAS SUPPLY SYSTEM

William C. Buttner, Winnetka, Ill., assignor to The Bastian-Blessing Co., Chicago, Ill., a corporation of Illinois Application March 11, 1938, Serial No. 195,275

3 Claims. (Cl. 221—73.5)

This invention relates to an apparatus and a method for supplying fuel from a plurality of containers to a single source or system of use and has for one object to provide means in connection with said containers whereby one container is supplying fuel at a time and whereby when one is empty or substantially empty, the next cylinder automatically goes into operation to supply fuel.

Another object is to provide a system of the type indicated in which any number of fuel containers may be associated together and in which each automatically supplies fuel as the preceding one is emptied, this operation taking place automatically and successively from container to container until all in turn have supplied fuel.

Another object is to provide in an installation of the type indicated in which separate controls and separate regulators are provided for each of a plurality of containers feeding to a single source of use and wherein each of said regulators is set for a different pressure.

Other objects will appear from time to time in the specification and claims.

The invention is more or less diagrammatically illustrated in the accompanying drawing, wherein:

Figure 1 is a diagrammatic illustration of an installation comprising three containers.

Like parts are indicated by like characters throughout the specification and drawing.

As shown in the figure, there are three containers each numbered 1. These may be of any desired shape or construction and are arranged to contain fuel which may be vaporous, liquid or both. As shown, the cylinders are identical although cylinders of this type might be assembled together in a single installation. Each cylinder has a housing 2 secured to it by a section 3, an outlet connection 4 is joined to each of the housings 2 and a valve which is not shown is arranged within the housing, the handle 5 projects outwardly and by means of this handle the valve is opened or closed or adjusted, as desired. A safety relief valve 6 may be joined to each of the housings 2 to provide a safety relief means in case of excess pressure.

Each of the members 4 is secured to a conduit 7 which may be of any desired material and is frequently a metallic tube. For each of the cylinders a separate pressure regulator is provided. The details of these regulators are not an essential part of the invention and are not shown. Many different types of pressure regulators might be used. As here shown there is a pressure regulator X, Y or Z for each of the containers. The conduit 7 of the right-hand container of the figure is joined by suitable couplings to the regulator X, a valve housing 8 is joined to the regulator on its outlet side and is connected to a manifold 9.

The regulator Y for the second container is joined to it by means of the conduit 7 which engages connection parts joined to the regulator Y, a valve housing and valve regulator 10 are joined to the regulator Y and by means of conduit 11 and a T 12 are joined to the manifold 9. Similarly the third container is secured by means of the conduit 7 and suitable connection parts to the regulator Z. Secured to the discharge side of the regulator Z is a valve and valve housing, indicated generally at 13. By means of connection parts 14 and a T 15 connection is made from the regulator Z to the manifold 9. This manifold by suitable connection parts is secured to a housing 16 to which a gauge 17 may be connected. The housing 16 is connected to a final pressure regulator 18 which by means of a conduit or lead line 19 carries the fluid to the point of use which may be an illuminating system or any other system or apparatus designed to use the fuel from the tanks. If desired, a safety relief valve 20 having a vent 21 may also be secured to the regulator 18.

The details of the various regulators have not been shown since those details form no essential part of the present invention. In general each of the regulators, X, Y and Z, is a diaphragm type of regulator provided with the necessary adjusting or setting means by means of which it may be set or adjusted to operate at a desired predetermined pressure. Similarly, the main regulator 18 is preferably a diaphragm regulator and it too is provided with adjusting means so arranged that it may be set to furnish fluid at a predetermined and adjustable pressure into the system for which fuel is being supplied.

Although I have shown and described an operative form of my device, it is obvious that many changes in the form, shape and arrangement of parts may be made without departing from the spirit of my invention and I wish, therefore, that my showing be taken as in a sense diagrammatic.

The use and operation of the invention are as follows:

A system comprising a plurality of containers is mounted in any desired manner and upon any desired support, either stationary or movable. However many containers may be utilized in the system, a main manifold or fuel line is provided and to it each of the containers is connected by a suitable conduit and for each of the containers between it and the manifold, a separate pressure regulator is provided.

To insure the automatic and successive emptying of the containers, the regulator of each container is so set that they operate at successively reducing pressures. Thus the regulator X may be set for 60 lbs., the regulator Y for 45 lbs. and the regulator Z for 30 lbs. If more containers were used, the settings of the regulators might be different, but in any event they would be so arranged as to cause one container after the other to discharge into the manifold so that unless some positive change or manipulation is made, the containers will finally all be emptied. It is not essential that the containers be emptied in a straight line movement but for ordinary purposes that is preferable and as herein indicated, the right-hand container would be emptied first, then the center container and finally the left-hand container.

Assuming an installation substantially as shown, the three cylinders might be mounted on a stationary or movable support, the installation here shown is particularly adaptable for use in connection with railway cars and when so used the three cylinders are mounted on the car to furnish fuel for any desired use, for example, for use in lighting or for use in operating an internal combustion engine or for any other desired purpose, the right-hand regulator being set for 60 lbs., the second for 45 lbs. and the third for 30 lbs. as indicated. When the system is to operate, the governors will be set as indicated, the valve 5 for each of the containers will be opened so that fluid may pass readily from the container to its regulator. Under this condition the regulator which has been set for 60 lbs. permits pressure to discharge into the line or manifold 9 which leads to the final regulator 18. The accumulation of 60 lbs. pressure in this line backs up through the T's and connections 11, 12 and 14, 15, and into the housing of the other two regulators Y and Z and reacts against the diaphragms of those regulators. Since each of these regulators is set at a lower pressure than the regulator X, the 60 lbs. pressure upon the diaphragm of each of them holds them positively closed.

As the gas or fluid is exhausted from the first cylinder, the pressure in that cylinder automatically drops and when it has fallen to 45 lbs., the regulator Y may open and fluid flows from the second cylinder controlled by the regulator Y. This 45 lbs. pressure is then effective through the line or manifold 9 and through the T and connection 15, 14 upon the regulator Z. Since this regulator is set for 30 lbs., the 45 lb. pressure keeps it closed until the fluid has been substantially exhausted from the second container. Then the pressure in the line may fall to approximately 30 lbs. and the regulator Z may open to permit discharge of fluid from the third container. This process would continue irrespective of the number of containers until the last had been emptied, unless in the meantime, one of the other emptied containers should be refilled or exchanged for a new full container. In that case the process would begin again and the containers whose regulators are set for the lower pressures might not be emptied.

An important advantage of the present system lies in the fact that in the servicing of cars to supply them with the necessary fresh tanks, the service man may determine quickly by determining the particular pressure on the supply line, just which of the cylinders are empty and which need replacement. Thus if the pressure on the gauge 17 shows 45 lbs. with the regulator settings above suggested, the service man can tell at once that only the first cylinder has been emptied and that the second cylinder is emptying. He can then replace the first cylinder and if desired, also replace the second cylinder or he may remove the second cylinder and determine how nearly empty it is and may then replace it either as the first cylinder or the second cylinder, putting a totally new cylinder in the second position. It is immaterial exactly what the service man does but the effect of the present installation is to furnish him with positive information as to the condition of the system as a whole so that he can tell what needs to be done to replenish the system.

I claim:

1. In combination in a fuel supply system, a plurality of separate fuel containers, a main fuel supply line, connections from each of said containers to said line, a pressure regulator positioned in each of said connections and adapted to regulate the pressure at which fuel flows from each container to said line, means for maintaining the final supply of fuel to a point of use at a substantially constant pressure, irrespective of which container is feeding fuel, said means comprising a final pressure regulator connected to said fuel line at a point beyond the connection of said containers to said line and a pressure gauge positioned in said main fuel line and adapted to indicate the pressure therein, each of the first mentioned regulators being set to operate at a pressure different from that of the others, whereby the container whose regulator is set to the highest pressure discharges first and the remaining containers discharge successively in the order of the pressure at which the regulator of each is set to operate.

2. In combination in a fuel supply system, a plurality of separate fuel containers, a main fuel supply line, connections from each of said containers to said line, a pressure regulator positioned in each of said connections and adapted to regulate the pressure at which fuel flows from each container to said line, means for maintaining the final fuel supply from said main fuel supply line at a substantially constant pressure, said means comprising a final pressure regulator in said fuel line at a point beyond the connection of said containers to said line, each of the first mentioned regulators being set to operate at a pressure different from that of the others, whereby the container whose regulator is set to the highest pressure discharges first and the remaining containers discharge successively in the order of the pressure at which the regulator of each is set to operate, and means in the supply line adapted to indicate which of the fuel containers is feeding to the supply line.

3. In combination in a fuel supply system, a plurality of separate fuel containers, a main fuel supply line, connections from each of said containers to said line, a pressure regulator positioned in each of said connections and adapted to regulate the pressure at which fuel flows from each container to said line, means for maintaining the final fuel supply from said main fuel supply line at a substantially constant pressure, said means comprising a final pressure regulator in said fuel line at a point beyond the connection of said containers to said line, each of the first mentioned regulators being set to operate at a pressure different from that of the others, whereby the container whose regulator is set to the highest pressure discharges first and the remaining containers discharge successively in the order of the pressure at which the regulator of each is set to operate, and visual means in communication with the supply line and adapted to indicate which of the containers is feeding to the supply line and which, if any, have been exhausted, said means comprising a visual gauge in communication with the supply line.

WILLIAM C. BUTTNER.